Nov. 22, 1966    E. RIETZLER ETAL    3,286,557
MACHINE REAMERS WITH INTERCHANGEABLE CUTTERS
Filed Dec. 20, 1963
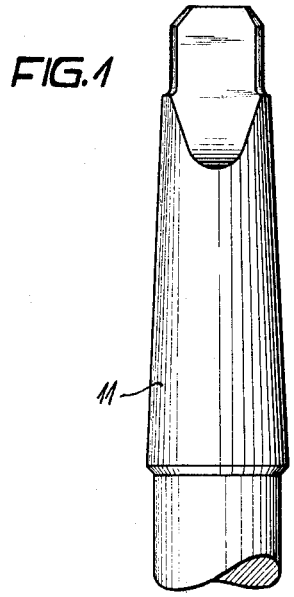
FIG.1
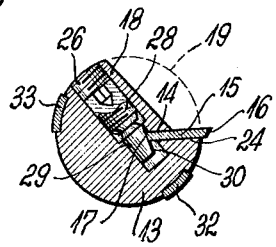
FIG.2
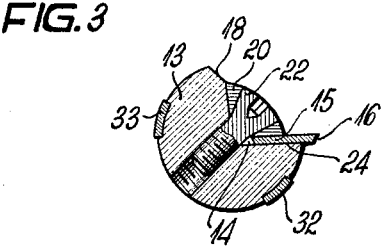
FIG.3
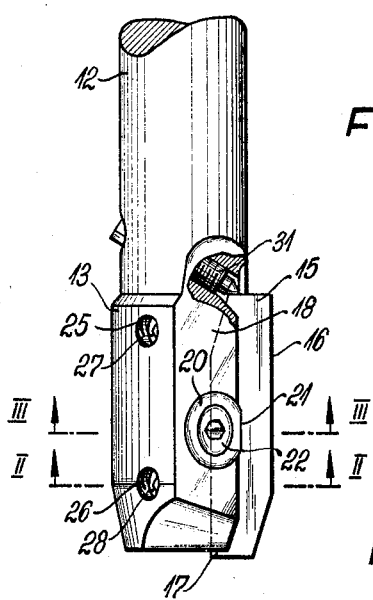
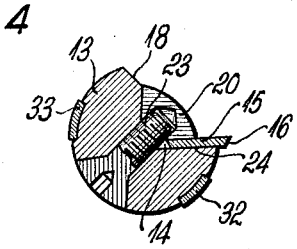
FIG.4
FIG.5
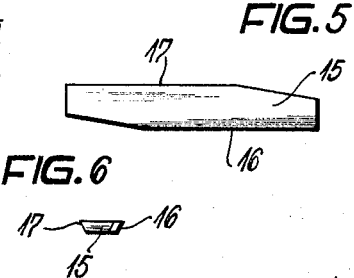
FIG.6
INVENTORS
ERICH RIETZLER
HERMAN HAILER
GEORG KRESS
BY
Albert C. Johnston
ATTORNEY

United States Patent Office 3,286,557
Patented Nov. 22, 1966

3,286,557
MACHINE REAMERS WITH INTERCHANGEABLE CUTTERS
Erich Rietzler, Wasseralfingen, and Hermann Hailer and George Kress, Aalen, Germany, assignors to MAPAL Fabrik fur Präzisionswerkzeuge Dr. Kress KG., Aalen, Wurttemberg, Germany, a corporation of Germany
Filed Dec. 20, 1963, Ser. No. 332,094
Claims priority, application Germany, Dec. 22, 1962, M 55,229, M 55,230, M 55,231
12 Claims. (Cl. 77—75.5)

The invention relates to a machine reamer having at least one cutter which is arranged to be interchangeable and adjustable in a cylindrical main body and is adapted to be clamped fast against a bearing surface of the main body.

In tools of this kind, the main body generally comprises a deep slot in which the cutter is guided and against one side wall of which it is clamped with the help of one or more pressure screws after its radial working position has been set by means of adjusting screws which bear against the rear edge of the cutter and can be moved to a greater or less distance into the slot in the main body depending on requirements.

As experience has shown, the known machine reamers of the aforesaid type do not always meet all the requirements expected of them. For example there is a danger that the points of the adjusting screws bearing against the cutter will gradually become worn and will operate inaccurately or will yield under the working pressure, and even the cutter edges may be damaged. It has also been found that the pressure screws used for clamping the cutter can widen the guide slot when clamping, so that not only is a gap formed in which the chips removed from a workpiece may possibly collect, but elliptical deformation of the main body is also caused. Finally, in known constructions it is not possible to provide adequate chip escape space since adequate material must be made available for the support of the clamping screws.

The invention has as its object to eliminate the disadvantages existing up to the present time in a machine reamer of the type initially specified by providing a novel construction. This consists in that the radial adjustment of the cutter is effected by means of linearly displaceable adjusting elements which operate on the inclined surface principle, and which, guided in the main body and bearing against the rear edge of the cutter, are adjusted by means of screws which are mounted in the main body and debouch in a manner know per se outside the chip escape region.

Such an arrangement makes it possible for the cutter to be adjusted quickly to the particular cutting circle required and to hold it reliably when the desired adjustment is obtained, without any detrimental wear occurring on the adjusting elements or the cutter edge, and in such a manner as to make it possible to provide a large smooth escape space for the chips. The entire tool is extremely simple and compact in form and construction. In addition, it is now possible to arrange for the cutter blade to have cutting edges at both longitudinal edges.

In a preferred form of embodiment of the invention, the guide bores of the adjusting elements and the screw-threaded bores which follow them in the axial direction for accommodating the adjusting screws in the main body extend approximately parallel to a chip escape surface which precedes the cutter breast at an obtuse angle to the plane of the cutter blade. The cutter blade along its foot or inner marginal portion can then engage into a shallow guide slot bounded at one side by the abutment surface which adjoins the chip escape surface.

In a further development of the invention, advantageously the interchangeable cutter is drawn against the abutment surface of the main body by means of a clamping claw.

It is particularly convenient if the clamping claw is tightened by means of a tension screw whose head is also outside the chip escape surface. It is then possible to give the head of the clamping claw a smooth shape or to make it finish flush in the same plane as the remainder of the chip escape surface.

The adjustment of the axial position of the initial cutting point of the cutting edge is a laborious operation in known reamers, and in order to facilitate this operation, i.e. to enable the cutter to be adjusted more easily so that its front edge when the reamer enters a bore is situated in front of the corner point of the guide strips which are normally inserted in the main body, it is expedient to provide, additionally to the means for adjusting the radial position of the cutter, adjusting elements for adjusting its axial position which at the same time serve as abutments for accepting axial forces and eliminate any risk of the cutter slipping back in the cut.

The possibility of adjusting the axial position has an extremely useful effect particularly if, in order to reduce subsequent grinding costs in the case of steep chamfers, only the cutting edge of the cutter and not its guide edge is subsequently ground and consequently only the axial position and not the radial position of the cutter blade needs to be corrected when the cutter is re-inserted.

Finally, it has been found particularly advantageous to use, instead of the hitherto conventional thick cutters which always have to be re-ground after a certain amount of use, cutters which are constructed as flat, narrow disposable cutters and are preferably provided with cutting edges at both longitudinal sides.

Such a tool, which for example (but this is not to be taken in any limiting sense) can be about 1 mm. in thickness, 35 mm. in length and 6 mm. in height and in the case of which if one cutting edge becomes unusable it is merely necessary to turn the cutter or if a second cutting edge becomes unusable it is merely necessary to replace the cutter with a new one. Since, owing to the small volume of material concerned, the material costs are very low and are scarcely significant even in relation to the costs which are involved in mass re-grinding, it is also possible to provide and keep in stock for one and the same reamer a plurality of cutters consisting of various grades of hard metal adapted to the particular materials being machined, without involving substantially higher costs than would be involved for providing one of the large-volume cutters used hitherto.

One example of embodiment of the machine reamer according to the invention is illustrated in the drawings wherein:

FIGURE 1 is a plan view on to the novel reamer;
FIGURE 2 is a sectional view on II—II of FIGURE 1;
FIGURE 3 is a sectional view on III—III of FIGURE 1;
FIGURE 4 shows a modified clamping claw holding means, viewed in the plane B—B.
FIGURE 5 is a plan view on to the cutter of the reamer according to FIGURE 1.
FIGURE 6 is an end view of the cutter shown in FIGURE 5.

FIGURE 1 shows the cylindrical main body of a single-cutter machine reamer comprising the shank 11, neck 12 and head 13. Mounted in the head 13, embedded in a shallow slot 14, is a very narrow cutter 15 which has cutting edges 16 and 17 at both longitudinal edges. The cutter is a narrow, thin blade which can be thrown away after both its edges have been worn.

The slot 14 is adjoined at an obtuse angle by a chip escape surface 18. This surface can be taken relatively sharply towards the centre of the main body since there is no need to insert cutter clamping screws in it as in the case of known tools. As a result, a wide space is obtained between the borehole wall and the chip escape surface, as the broken line 19 (FIGURE 2) shows clearly.

The cutter 15 is secured in the slot 14 by means of a claw 20 which may be variously shaped, e.g. may have the form of a rectangular plate which is inserted in a recess in the surface 18 open towards the slot 14. In the example illustrated the claw is a round, conical head—see FIGURE 1. This head, which is provided with a secant 21 for bearing with a broad surface against the cutter, is either tightened with a headed screw 22 as is shown in FIGURE 3 or is secured from the rear by a screw 23 as FIGURE 4 shows.

When the claw is tightened by means of the screw 22 or 23, which is actuated e.g. by means of a spanner, the cutter 15 is pressed against the abutment surface 24 provided on the main body head 13 and bounding the slot 14 at one side.

The necessary radial adjustment of the cutter 15 is effected as follows according to the invention:

Provided in the head 13 of the main body are two bores 25, 26 which extend approximately parallel to the chip escape surface 18. Adjustable in these bores, which are screwthreaded at least over part of their length, are screwthreaded pins 27, 28 which can push before them the piston-form adjusting elements 29 (FIGURE 2). The latter bear against the inner edge 17 of the cutter 15 and operate on the sloping plane principle i.e. like wedges. They can be either cylindrical or polygonal, or as in the illustrated example, have a blade wedging surface in the form of a sloping face 30 which extends parallel to the cutter back or inner edge 17. The cutting circle of the cutter 15 can be regulated in accordance with the extent to which the elements 29 are displaced.

Hard metal guides 32, 33 which are known per se are inserted in the main body of the tool and the cutter 15 is axially displaceable or adjustable by a screw 31 which also operates on the wedge principle. The arrangement here could also be that the screw 31 pushes a wedge element in front of it.

The invention is not, of course, limited to the illustrated example of embodiment.

We claim:

1. A reamer comprising an elongated body rotatable about its longitudinal axis and presenting a substantially radial abutment surface, an elongated blade having one face thereof bearing against said abutment surface, means for clamping the blade to said surface, at least one adjusting element displaceable in said body in a path at an angle to the plane of said blade, each said element presenting a wedging surface bearing against the inner edge of the blade for fixing the radial position of the blade in said body, and means for adjusting the position of each said adjusting element, said blade having opposite longitudinal side edges each adapted to serve as a cutting edge, either of which edges may be positioned for cutting while the other constitutes the inner edge of the blade, each said wedging surface mating with whichever of said edges is disposed as said inner edge.

2. A reamer according to claim 1, said side edges being inclined in opposite directions relative to the plane of said blade, and each said wedging surface being sloped and displaceable in substantially parallel relation to the inclination of the inner of said edges.

3. A reamer according to claim 1, said blade being a flat disposable metal blade having a thickness of the order of 1 mm.

4. A reamer according to claim 1, said clamping means comprising a head bearing against the other face of the blade and seated in a recess in said chip escape surface, and means extending through said body away from said blade for tightening said head against said blade.

5. A reamer according to claim 1, and a further adjusting element displaceable in said body in a path at an angle to its axis and presenting a wedging surface bearing against an end of said blade for fixing and adjusting the axial position of said blade.

6. A reamer comprising an elongated body rotatable about its longitudinal axis and presenting a substantially radial abutment surface, an elongated blade having one face thereof bearing against said abutment surface, means for clamping the blade to said surface, a plurality of adjusting elements displaceable in said body in paths spaced apart axially and extending at an obtuse angle to the plane of said blade, each of said elements presenting a wedging surface bearing against the inner edge of the blade for fixing the radial position of the blade in said body, said body having a chip escape surface leading away from the other face of said blade at an obtuse angle thereto, and means outside the chip escape region and accessible at a side of said body away from said blade for adjusting the position of said adjusting elements.

7. A reamer according to claim 6, said blade having opposite longitudinal side edges inclined in opposite directions relative to the plane of the blade and each adapted to serve as a cutting edge, either of which edges may be positioned for cutting while the other constitutes the inner edge of the blade, said wedging surfaces being sloped and displaceable in substantially parallel relation to the inclination of whichever of said edges is disposed as said inner edge.

8. A reamer according to claim 7, said adjusting elements comprising linearly slidable members having substantially flat inclined surfaces forming said wedging surfaces.

9. A reamer according to claim 6, said position adjusting means comprising screws threaded in said body in bores extending substantially parallel to said chip escape surface.

10. A reamer according to claim 6, said clamping means comprising a head bearing against said other face of the blade and seated in a recess in said chip escape surface, and means extending through said body away from said blade for tightening said head against said blade.

11. A reamer according to claim 10, the outer surface of said head at the periphery thereof being substantially flush with said chip escape surface.

12. A reamer according to claim 6, and a further adjusting element displaceable in said body in a path at an angle to its axis and presenting a wedging suface bearing against an end of said blade for fixing and adjusting the axal position of said blade.

References Cited by the Examiner

UNITED STATES PATENTS

| | | | |
|---|---|---|---|
| 470,295 | 3/1892 | Feldt et al. | 77—75 |
| 1,273,752 | 7/1918 | Ebert | 77—75 |
| 1,938,773 | 12/1933 | Ernst et al. | 29—105.1 |
| 1,978,084 | 10/1934 | Howard | 29—105.1 |

FOREIGN PATENTS

| | | |
|---|---|---|
| 1,090,373 | 11/1954 | France. |
| 52,100 | 5/1890 | Germany. |

FRANCIS S. HUSAR, *Primary Examiner.*